(12) United States Patent
Sharma

(10) Patent No.: US 7,680,816 B2
(45) Date of Patent: Mar. 16, 2010

(54) METHOD, SYSTEM, AND COMPUTER PROGRAM PRODUCT PROVIDING FOR MULTIMODAL CONTENT MANAGEMENT

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 313 days.

(21) Appl. No.: 11/615,427

(22) Filed: Dec. 22, 2006

(65) Prior Publication Data

US 2008/0155672 A1 Jun. 26, 2008

(51) Int. Cl.
*G06F 17/30* (2006.01)
(52) U.S. Cl. .................................. 707/102; 715/200
(58) Field of Classification Search ............... 707/102, 707/104.1, 3–5; 709/203; 715/200, 205, 715/234; 719/328
See application file for complete search history.

(56) References Cited

U.S. PATENT DOCUMENTS

| | | | |
|---|---|---|---|
| 6,699,125 B2 * | 3/2004 | Kirmse et al. ................ 463/42 |
| 7,003,464 B2 * | 2/2006 | Ferrans et al. ............ 704/270.1 |
| 7,174,509 B2 * | 2/2007 | Sakai et al. .................. 715/201 |
| 7,188,143 B2 * | 3/2007 | Szeto .......................... 709/206 |
| 7,210,098 B2 * | 4/2007 | Sibal et al. .................. 715/205 |
| 7,509,377 B2 * | 3/2009 | Harvey et al. ............... 709/206 |
| 2008/0189399 A1 * | 8/2008 | Quoc et al. .................. 709/223 |

* cited by examiner

*Primary Examiner*—Cheryl Lewis

(57) ABSTRACT

Systems, methods, devices, and computer program products are provided for providing a user with access to information stored in a datastore. A multimodal system operatively coupled to the datastore is configured to communicate with the user via a user device. The multimodal system is configured to receive a request from the user to communicate with the user through a user interface of the user device. In response to the received request, the multimodal system generates a multimodal document. The generated multimodal document includes instructions allowing for communication with the user using a plurality of different user interface modalities that may be available on a user device. The multimodal system then serves the multimodal document to the user device using a communication interface. The multimodal system is configured to only publish one multimodal document at a time for a given user session so that the user may seamlessly switch between user interface modalities that may be available on the user device or on another user device.

22 Claims, 9 Drawing Sheets

METHOD, SYSTEM, AND COMPUTER PROGRAM PRODUCT PROVIDING FOR MULTIMODAL CONTENT MANAGEMENT

BACKGROUND

FIG. 1 is a block diagram illustrating a conventional project management system 100 including various project management tools and applications. In the conventional project management system 100, a user may be able to access content stored in one or more datastores 125 using, for example, a web based application 105, a client/server application (e.g., Citrix® or another virtual network computing (VNC) application) 110, a stand alone application 115, or a query-based application 120. The information in the datastores 125 may be stored in various application-specific formats such as word processing document formats, spreadsheet document formats, project management-specific formats (e.g., Microsoft Project™ formats), relational database management system formats, or the like. The various applications may provide an interface that can allow users of the system to perform different project management functions such as updating tasks, deleting tasks, adding new tasks, and the like.

The conventional project management applications permit users to perform project management functions by accessing application-specific documents in the datastore 125. These documents contain application-specific language that enables the application to present information in the document to the user via the application's interface. In other words, in conventional content management systems, a user must have a device equipped with a specific project management application or must otherwise directly access a specific project management application. Furthermore, if a user is to be able to use more than one application for project management, the datastore 125 must maintain and synchronize project management related data for each application that a user may use.

Conventional project management systems fail to provide a universal or ubiquitous method of identifying, retrieving, and acting on the content in a datastore and do not allow a user to seamlessly switch from one mode of communication to another mode of communication when communicating with the project management system.

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Figure 1:
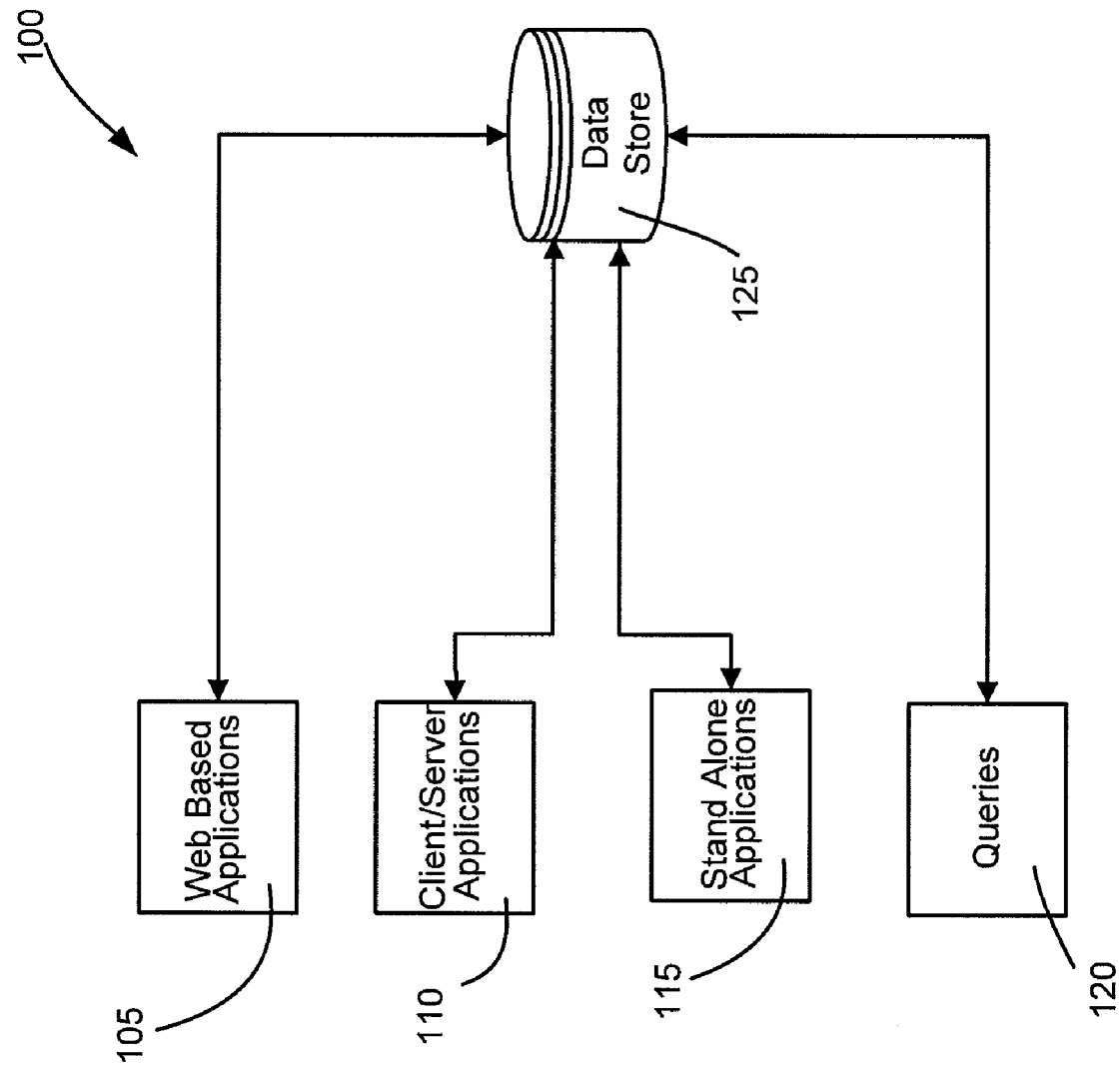
FIG. 1 illustrates a conventional project management environment.

A content management system is provided that is configured to allow for communication of information between a user and a datastore, such as a database system, a file system, and/or a directory system. Specifically, embodiments provide for a more universal system for accessing and/or managing content in a datastore. In particular, embodiments provide a system where a user is not limited to accessing a datastore using only content management-specific applications, such as the content management applications mentioned above in relation to FIG. 1. Furthermore, embodiments provide a system that enables multimodal interaction between the user and the content management system.

Multimodal interaction allows users or user devices to dynamically select the most appropriate mode of interaction for the user's current needs. For example, depending upon the capabilities of the user's device, the user may be able to provide user input in the form of speech, handwriting, keystrokes, or other user input modalities. Similarly, depending upon the capabilities of the user device, the user may be able to receive user output presented via displays, audio mechanisms such as pre-recorded and/or synthetic speech, tactile mechanisms such as mobile phone vibrators and Braille strips, or other user output modalities. A system is therefore provided that allows a user to more easily switch between different modes of interaction when interacting with the content management system.

The following description and corresponding figures are directed to exemplary embodiments where the content management system is specifically embodied as a project management system. A project management system, however, is just one example of a system that may benefit from embodiments. In accordance with other embodiments, the multimodal systems described herein with respect to the project management system may be applied to other content management systems where a user or other entity desires to access information in a datastore.

Figure 2:
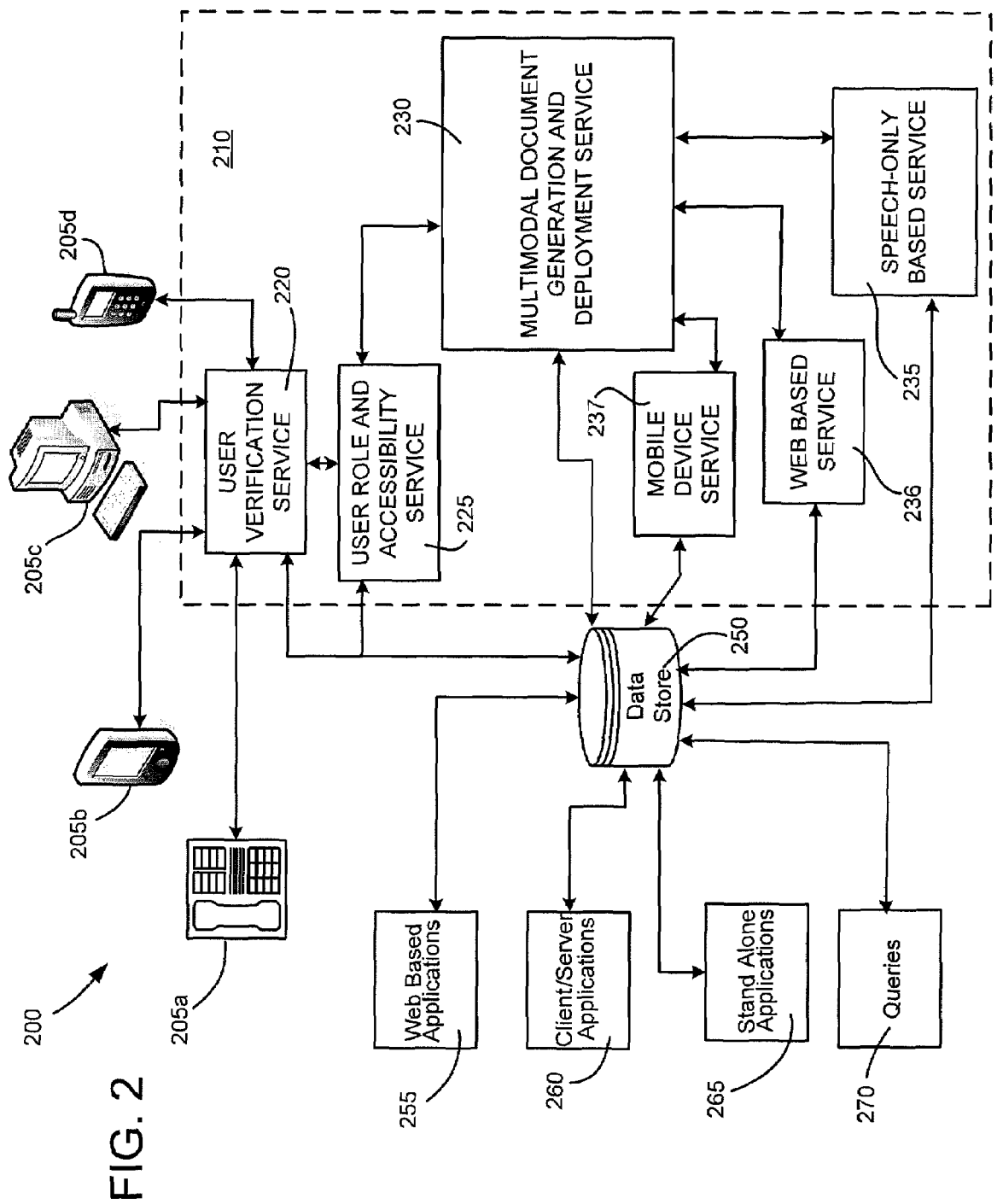
FIG. 2 illustrates a project management environment in accordance with an embodiment.

Referring now to FIG. 2, a Project Management Network Environment 200 is illustrated in accordance with an embodiment. In the illustrated embodiment, the Project Management Network Environment 200 includes a number of user devices 205 that a user may use to access and manipulate project management information. Different user devices may have different user interface capabilities as well as different communication capabilities. For example, one user device may support tactile input while another user device may only support audio input, such as voice input. Furthermore, some user devices may be configured to support more than one type of user input and/or user output. As described in detail below, embodiments allow for communication with the project management system using a plurality of user input/output modalities and communication protocols without requiring that the user device be equipped with project management-specific applications. As such, in one exemplary embodiment, a first user may be able to input information into the project management system using a first user input mode of a first device, while a second user may also be able to input information into the project management system using a second different user input mode of a second device. Similarly, the first user may be able to input information into the project management system using, for example, a second user input mode of the first device or a third user input mode of a third device.

For example, a user may desire to access the project management system using the mobile Internet capabilities of a mobile phone and communicate with the project management system using the phone's display and keypad. While the user is accessing the project management system, the user may suddenly need to drive somewhere and therefore would desire to now be able to access the project management system using the phone's telephony capabilities so that the user can communicate with the project management system without viewing the display and without using the keypad. The user may then arrive at his or her office and may desire to now access the project management system using his or her web based personal computer. Embodiments may permit the user to seamlessly switch between different user interface modalities available to the user, whether they be available on the same user device or on different user devices.

In the illustrated embodiment of the Project Management Network Environment 200, exemplary user devices 205 may include a telephony device 205a (e.g., a voice over internet protocol (VOIP) phone, a conventional public switched telephone network (PSTN) phone, or a mobile (e.g., cellular) phone), a personal digital assistant (PDA) 205b, a personal computer (PC) 205c, and a smart phone with a visual display 205d. Of course, other types of electronic devices not illustrated may also be used by a user to access and manipulate project management data.

The Project Management Network Environment 200 may further include one or more datastores 250, which may include, for example, a database system, a file system, and/or a directory system. The datastore 250 is configured to store project management information therein. The Network Environment 200 may further include a Multimodal System 210 operatively coupled to the datastore 250. The Multimodal System 210 includes a communication interface (not shown) that allows a user to access the Multimodal System 210 using at least one of the user devices 205. As discussed above, with respect to FIG. 1, the datastore 250 may also be operatively coupled to a number of conventional project management tools, such as a web-based management application 255, a client/server management application 260, a stand alone management application 265, and a query-based management application 270. As described in greater detail below, the Multimodal System 210 may allow a user to bypass having to directly use such conventional project management tools by allowing a user to conduct project management functions using the various input and output capabilities that may be standard on the user device that the user chooses to use at a given moment. In order to allow for such multimodal interaction between the user and the datastore 250, the Multimodal System 210 may include a User Verification Service 220, a User Role and Accessibility Service 225, a Multimodal Document Generation and Deployment Service 230, a Speech-Only Based Recognition Service 235, a Web Based Service 236, and a Mobile Device Service 237.

The components of the Network Environment 200 may be operatively connected as illustrated in FIG. 2, but may be located at remote locations. The components may be configured to communicate through various communication networks using communication protocols such as IP (Internet Protocol), SIP (Session Initiation Protocol), RTP (Real Time Protocol), Wireless Networking Protocols, and the like. In other embodiments, at least some of the network components may be located at the same location. For example, the functionality of the components of the Multimodal System 210 and the datastore 250 may be combined into a single entity.

In operation, when a user attempts to utilize a user device 205 to access project information stored in the database, the Multimodal System 210 may implement the User Verification Service 220 to authenticate the user. Multimodal System 210 may further determine the projects that the user is affiliated with as well as the user's role in the projects using the User Role and Accessibility Service 225. As described in greater detail below, the User Verification Service 220 and the User Role and Accessibility Service 225 may invoke the Multimodal Document Generation and Deployment System 230 in order to provide the user with multimodal options for providing the authentication information and for receiving project accessibility information.

Once the user is identified and the user's role and accessibility are determined for various identified projects, the Multimodal System 210 may implement the Multimodal Document Generation and Deployment Service 230 for generating multimodal documents that provide the user with project information in multimodal format and/or multimodal command options for managing and interacting with any project information in the datastore 250. In this regard, the Multimodal Document Generation and Deployment Service 230 may generate a single multimodal document that provides instructions for presenting a multimodal dialog to a user using a plurality of different user interface modalities that may be available to the user on the user device. The Multimodal Document Generation and Deployment Service 230 may then serve this multimodal document to the user device 205 that the user is utilizing to access the Multimodal System 210. The Multimodal Document Generation and Deployment Service 230 may be configured to serve the multimodal document using the same communication network and protocol used by the user device 205 to initially access the Multimodal System 210. Once the user device 205 receives the multimodal document, the user device 205 may present the multimodal dialog using perhaps only those user interface modalities for which the user device has the user interface capabilities to support and/or that the user has indicated a preference for using.

If the Multimodal Document Generation and Deployment Service 230 provides the user with a dialog comprising one or more command options and the user responds using one of the user device's available user input modalities, the Multimodal Document Generation and Deployment Service 230 may invoke the Speech-Only Based Recognition Service 235, the Web Based Service 236, the Mobile Device Service 237, or other services depending on the modality of the user input. For example, if the user selects a command option by speaking the option into the microphone of a telephony device 205a the Speech-Only Based Recognition Service 235 may then operate to receive the voice information or "utterances" from the user and interpret them for the Multimodal Document Generation and Deployment Service 230. Similarly, Web Based Service 236 and Mobile Device Service 237 may operate to receive and interpret audio input (e.g., voice input), tactile input (e.g., keypad, mouse, and touchpad input), or other types of input that may typically be generated by web based user devices or mobile user devices, respectively. The Speech-Only Based Recognition Service 235, the Web Based Service 236, and the Mobile Device Service 237 are only provided as exemplary services that the Multimodal System 210 may have for interpreting input received from a particular user input device. In other embodiments, the Multimodal System 210 may comprise a different combination of services for performing the function of interpreting user input. In an embodiment, the Multimodal System 210 may comprise a different service for each possible type of device and/or user input modality that users may desire to use when accessing the project management system.

In response to multimodal information or requests received from the user in response to a deployed multimodal document, the Multimodal Document Generation and Deployment Service 230 may generate and deploy additional multimodal documents. Furthermore, the Speech-Only Based Recognition Service 235, the Web Based Service 236, and/or the Mobile Device Service 237 may operate to modify project management information in the datastore 250 based on the received multimodal information or request. In this manner, effective project management functions may be performed without requiring that the user directly access the conventional project management tools described above.

Figure 3:
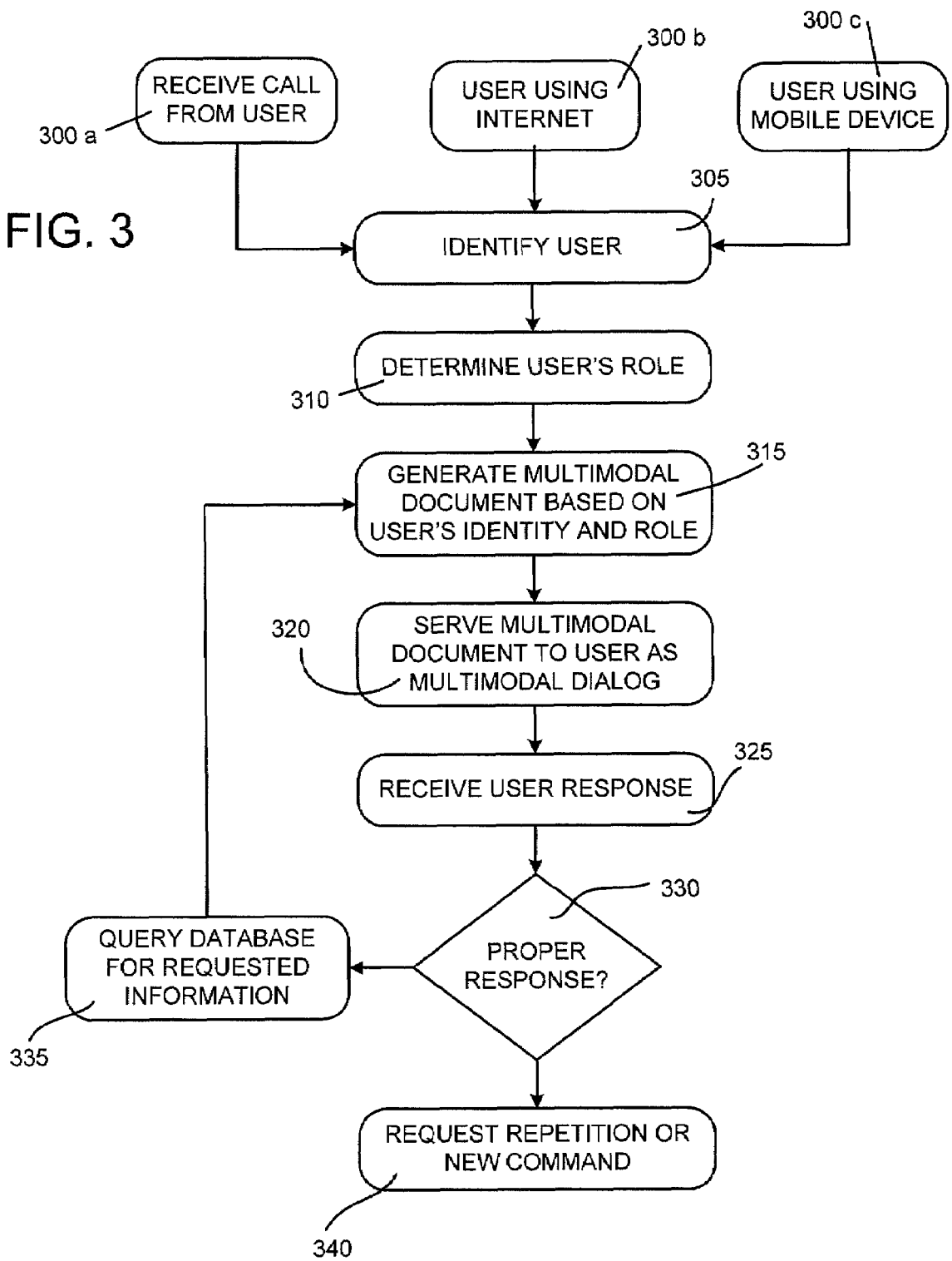
FIG. 3 is a flow chart illustrating exemplary processing for facilitating project management functionality via the environment of FIG. 2, in accordance with an embodiment.

FIG. 3 is a flow chart illustrating exemplary processing for facilitating project management functionality via user devices 205, in accordance with an embodiment. Processing may begin with the Multimodal System 210 receiving a call from a user via a telephony device 205a (block 300a), a Web based device such as a PC 205c (block 300b), and/or a mobile device such as a PDA 205b or a smart phone 20d (block 300c).

As represented by block 305, the user may be identified by the User Verification Service 220. The User Verification Service 220 may be configured to authenticate a user using any suitable methodology such as biometric and/or informational interrogation. For example, users may be prompted to speak a certain phrase or personal identification number (PIN). In biometric interrogation, the received voice response may be statistically compared to a voice model of the user previously stored in a user profile of the datastore 250. Additionally, the voice response may be further examined to determine the accuracy of the user's response so as to provide an additional level of security and authentication. In a solely informational interrogation, the received multimodal response may be recognized and simply compared to a correct response without performing biometric verification.

In an embodiment, the User Verification Service 220 invokes the Multimodal Document Generation and Deployment Service 230. The Multimodal Document Generation and Deployment Service 230 may then generate a multimodal document containing a plurality of user verification options including different options for different user input modalities that may be available to the user. For example, the document may contain a dialog in which the user is first prompted to enter user identification information by entering a user password. The dialog may contain instructions to prompt the user by displaying text, if the user device 205 has a display, and by synthetic speech, if the user device 205 has a speaker. The dialog may further permit the user to respond using a variety of user output modalities that may be available to the user. For example, the user may be permitted to respond by speaking a password into a microphone of a user device, typing a password using a keypad of a user device, or handwriting a password using a touchpad and/or stylus of a user device.

Once identified and/or authenticated, the User Role and Accessibility Service 225 may determine the user's access to projects and the user's role in the projects, as represented by block 310. For example, the User Role and Accessibility Service 225 may examine project information in the datastore 250 and use the user's identification to determine a user's projects, the user's role in the identified projects, and the levels and types of information and management functions that the user is permitted to access and perform with respect to each identified project. For example, a user identified as a project manager for a given project may be permitted to perform management functions commensurate with that role. Similarly, a user identified as a team member may be provided with access to a significantly reduced number of management functions.

Once the user's access permissions have been determined, the Multimodal Document Generation and Deployment Service 230 may generate a multimodal document based on the user's available project management options, as represented by block 315. For example, an initial multimodal document may be generated indicating or otherwise listing those projects for which the user has been permitted access. In this regard, multimodal documents may use multimodal language to specify interactive multimodal dialogues between a user and a user device. A multimodal document may follow the W3C Multimodal Interaction Framework. In this regard, the multimodal language may include an extensible markup language (XML) format. In such a case, the user device 205 may have an application configured to parse the multimodal language.

Once the multimodal document is generated, the Multimodal Document Generation and Deployment Service 230 may serve the multimodal document to the user as a multimodal dialog, as represented by block 320. The Multimodal System 210 may then receive a response from the user in the form of one or more user input modalities, as represented by block 325. If the response is proper a request is sent to the datastore 250 for appropriate action (i.e., creation of a new document and/or modification of information in the datastore 250), as represented by block 335. If the response is not proper or is not recognized, a new multimodal dialog may be presented to the user, as represented by block 335.

Figure 4:
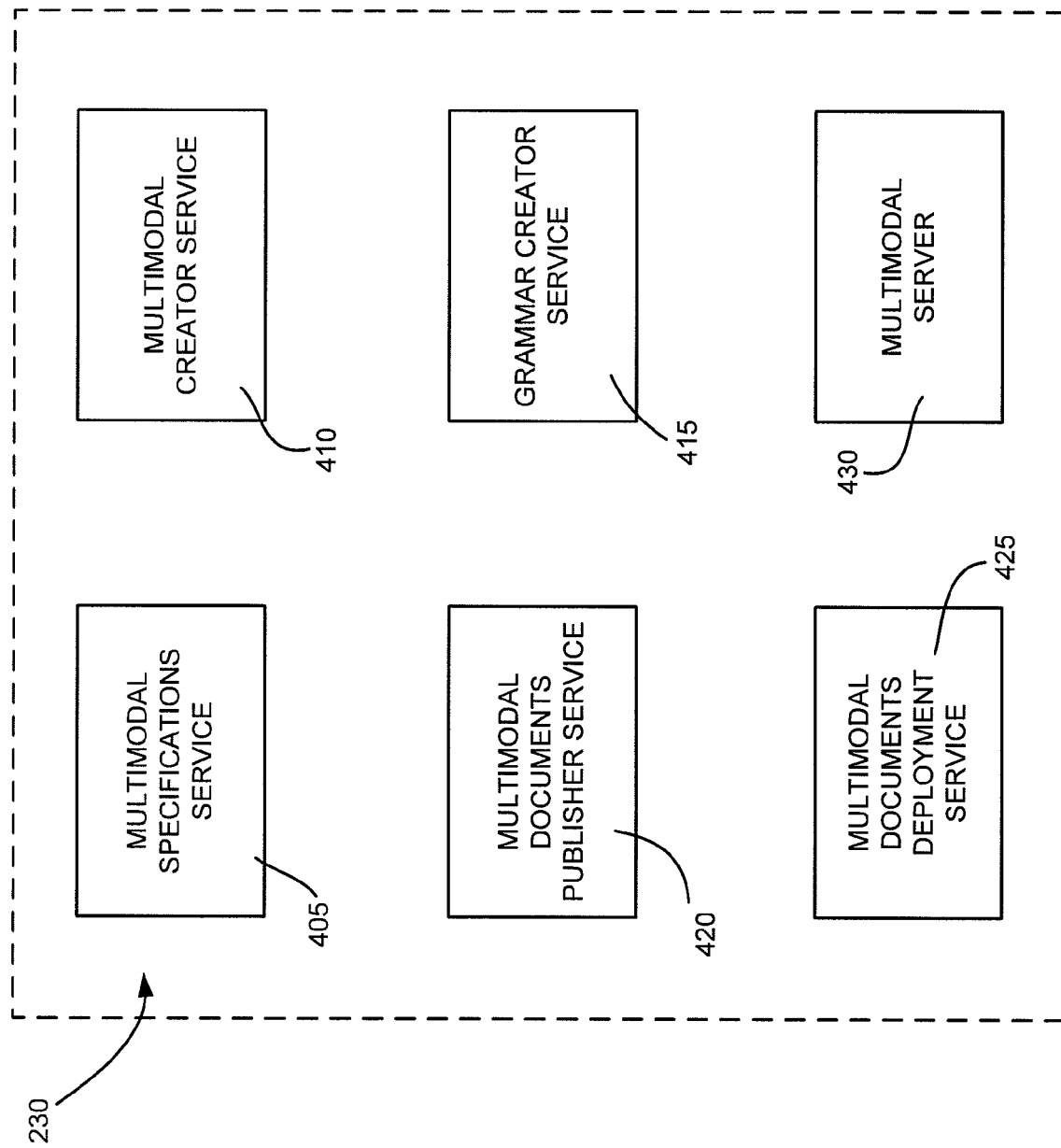
FIG. 4 is a block diagram illustrating the multimodal document generation and deployment service of FIG. 2, in accordance with an embodiment.

FIG. 4 is a block diagram illustrating the Multimodal Document Generation and Deployment Service 230 in greater detail, in accordance with an embodiment. As shown, the Multimodal Document Generation and Deployment Service 230 may include a Multimodal Specifications Service 405, a Multimodal Elements Creator Service 410, a Grammar Creator Service 415, a Multimodal Documents Publisher Service 420, a Multimodal Documents Deployment Service 425, and a Multimodal Server 430.

Multimodal Specifications Service 405 may be configured to specify the various defined multimodal elements of the multimodal language and the relationship between the multimodal elements. The multimodal specifications may be in accordance with the specifications recommended by the World Wide Web Consortium (W3C) Multimodal Group. For example, the multimodal specifications may describe markup for representing interpretations of user input (speech, keystrokes, pen input, text, etc.) together with annotations such as confidence scores (e.g., confidence that an interpretation of a multimodal input, such as voice or handwriting input, is correct), timestamps, input medium, etc.

Multimodal Elements Creator Service 410 may be configured to use data from the datastore 250 that is associated with a user's identification and create multimodal documents containing dialogs written using various multimodal elements defined by the multimodal specification. In general, documents are generated containing a multimodal markup language root element as well as sub elements for the individual user input and output modalities. For example, the multimodal documents may be generated using an XML format, such as the Extensible Multimodal Annotation markup language (EMMA). The multimodal document may contain a specific multimodal markup language, such as EMMA, that provides annotations and instructions for using other application-specific markup language(s) that are also included in the document.

Grammar Creator Service 415 may be configured to create any necessary grammar to enable user's to enter input into the system using such input modalities and user speech and/or handwriting that may require defined grammar specifications. The format of the grammar may be of any type and may include such grammar specifications as the Speech Recognition Grammar Specification (SRGS), the Grammar Specification Language (GSL), or the like. For example, where the user is managing a project entitled 'Payment Processing Types,' the Grammar Creator Service 415 may create grammar that enables a project manager to request information using the following statement: "Give me the team lead for the 'Payment Processing Types' project." Thus specification of suitable response grammars allows the Multimodal System 210 to properly interpret user responses to information provided to the user in a multimodal document.

Multimodal Documents Publisher Service 420 may be configured to publish a multimodal document for a particular user so that the multimodal document may be deployed by the Multimodal Document Deployment Service 425. In one implementation, multimodal documents may be tailored based on defined user proficiencies and capabilities. For example, users designated as expert users may be provided with abbreviated menu options or other multimodal shortcuts to increase the speed with which multimodal navigation may be performed. Alternatively, multimodal documents provided for more novice users may result in more descriptive voice prompts being served to the user.

Once created and published, a multimodal document may be deployed by Multimodal Document Deployment Service 425 to a Multimodal Server 430. In some embodiments, Multimodal Server 430 may be an application server, a web server, or any other type of server that can serve the multimodal documents to the user via the user device and a communication protocol supported by the user device.

Returning to FIG. 3, once a multimodal document has been created and served to the user, the Multimodal System 210 may receive a multimodal response or request from the user (e.g., in the form of an audio, visual and/or tactile user input) and use the appropriate service, such as the Speech-Only Based Recognition Service 235, the Web Based Service 236, and/or the Mobile Device Service 237 to interpret the multimodal response (block 325). Depending on the user's response and the grammars generated to recognize the response, project information or additional options may be provided to the user. For example, a served multimodal document may provide a listing of a plurality of current projects. Multimodal System 210 may then determine whether the received multimodal response is an appropriate or recognized response (block 330). As described above, grammars for the multimodal document have been previously defined by the Grammar Creator Service 415 and may facilitate the recognition of a number of suitable responses. For example, a defined grammar may enable recognition of and response to phrases such as "Tell me how many activities are behind schedule", "Who is the team lead?", "What are my critical state projects?", etc. In response to a recognized user request, the Multimodal System 210 may query the datastore 250 for the proper response (block 335). After information is received from the datastore 250, the system may forward the information to Multimodal Specifications Service 405, thereby initiating creation and serving of a responsive multimodal document that includes the system's response to the user's response (block 315). As mentioned above, if a received response is not recognized, Multimodal System 210 may request clarification or repetition from the user (block 340).

In an embodiment, the Multimodal System 210 may also perform outbound notification functionality to the user devices 205. The Multimodal System 210 may do so either upon request from a user or unilaterally in accordance with defined project management system rules stored in the datastore 250. In the embodiment described above, users may submit a request for the Multimodal System 210 to perform outbound notifications to individuals or groups associated with projects. In response to such a request, the Multimodal System 210 may perform an outbound notification function such as the dialing of a phone number and/or the sending of an email and/or text message in order to communicate information to other individuals or groups. In this manner, efficient communication between project participants may be facilitated.

Figure 5:
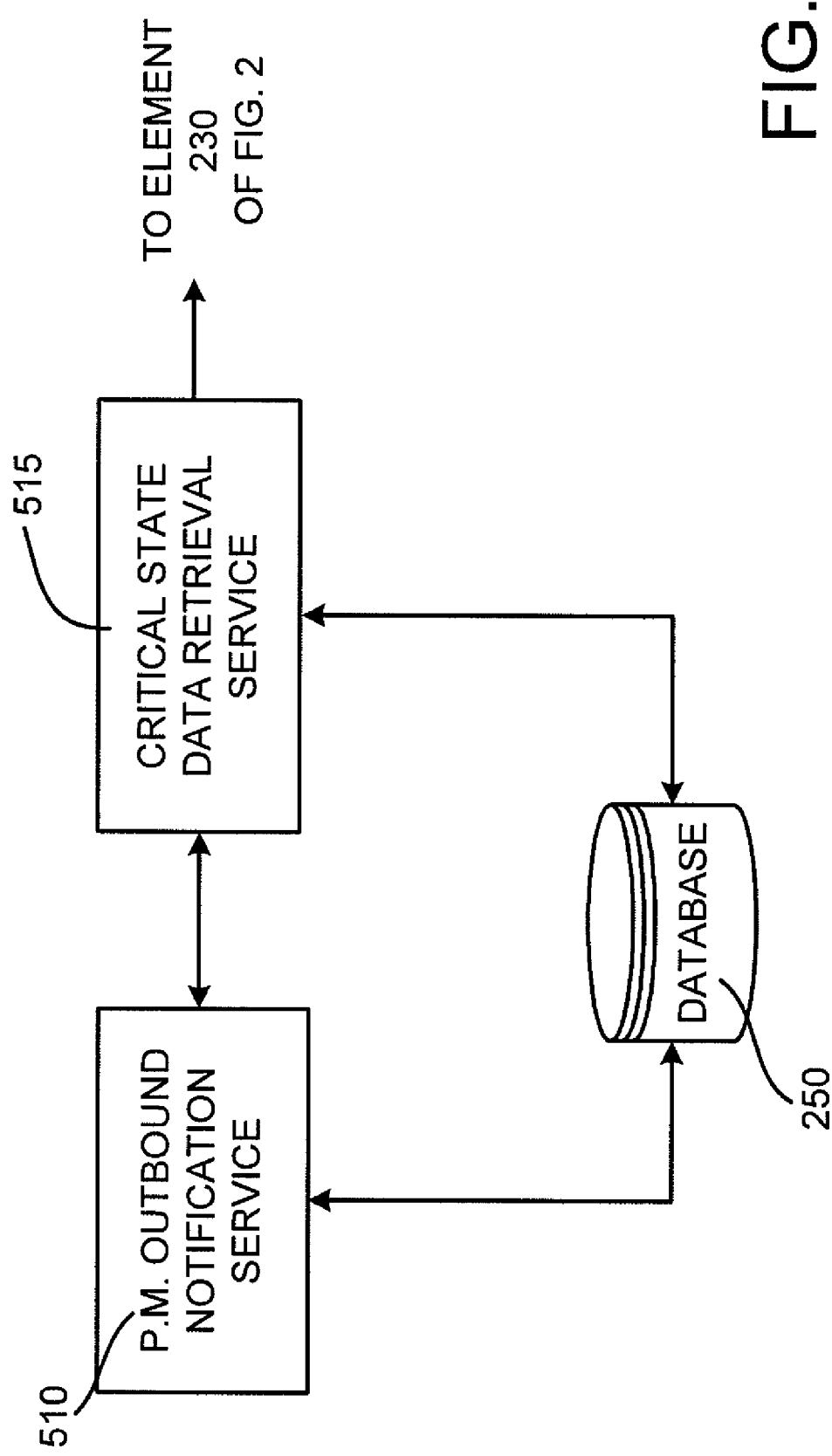
FIG. 5 is a block diagram illustrating additional elements of the multimodal system of FIG. 2 to facilitate outbound call notifications, in accordance with an embodiment.

FIG. 5 is a block diagram illustrating additional elements of the Multimodal System 210 consistent with an embodiment. As shown, the Multimodal System 210 may include a Project Management Outbound Notification Service 510 and a Critical State Data Retrieval Service 515. Each of these services 510 and 515 may be operatively coupled to the datastore 215 and the Multimodal Document Generation and Deployment Service 230.

The Project Management Outbound Notification Service 510 may be configured to monitor project states and provide information relating to projects having critical states in the form of an outbound notification to Critical State Data Retrieval Service 515. Each critical state may be defined by the project management team and/or by the rules of the respective project. For example, a project one day behind schedule may trigger an outbound notification stating that the project has reached a critical state. The Project Management Outbound Notification Service 510 may provide information about the critical project (e.g., the project name, the project manager's name, project resources, why the project is critical, etc.) to the Critical State Data Retrieval Service 515.

Upon receipt of an outbound critical state notification from the Project Management Outbound Notification Service 510, the Critical State Data Retrieval Service 515 may retrieve additional information about the project that has gone into the critical state from the datastore 250. For example, the Critical State Data Retrieval Service 515 may retrieve such information as the identification and contact information for the project manager or the number and nature of any overdue tasks. Once the necessary information is gathered, the Critical State Data Retrieval Service 515 may perform an outbound notification using telephone numbers, pager numbers, email addresses, text message addresses, etc. Additionally, the critical state information may be provided to Multimodal Document Generation and Deployment Service 230 for generation and deployment of a suitable multimodal document to present along with the outbound notifications and/or to notify the user requesting outbound notifications (if there is one) of the outbound notifications.

Figure 6:
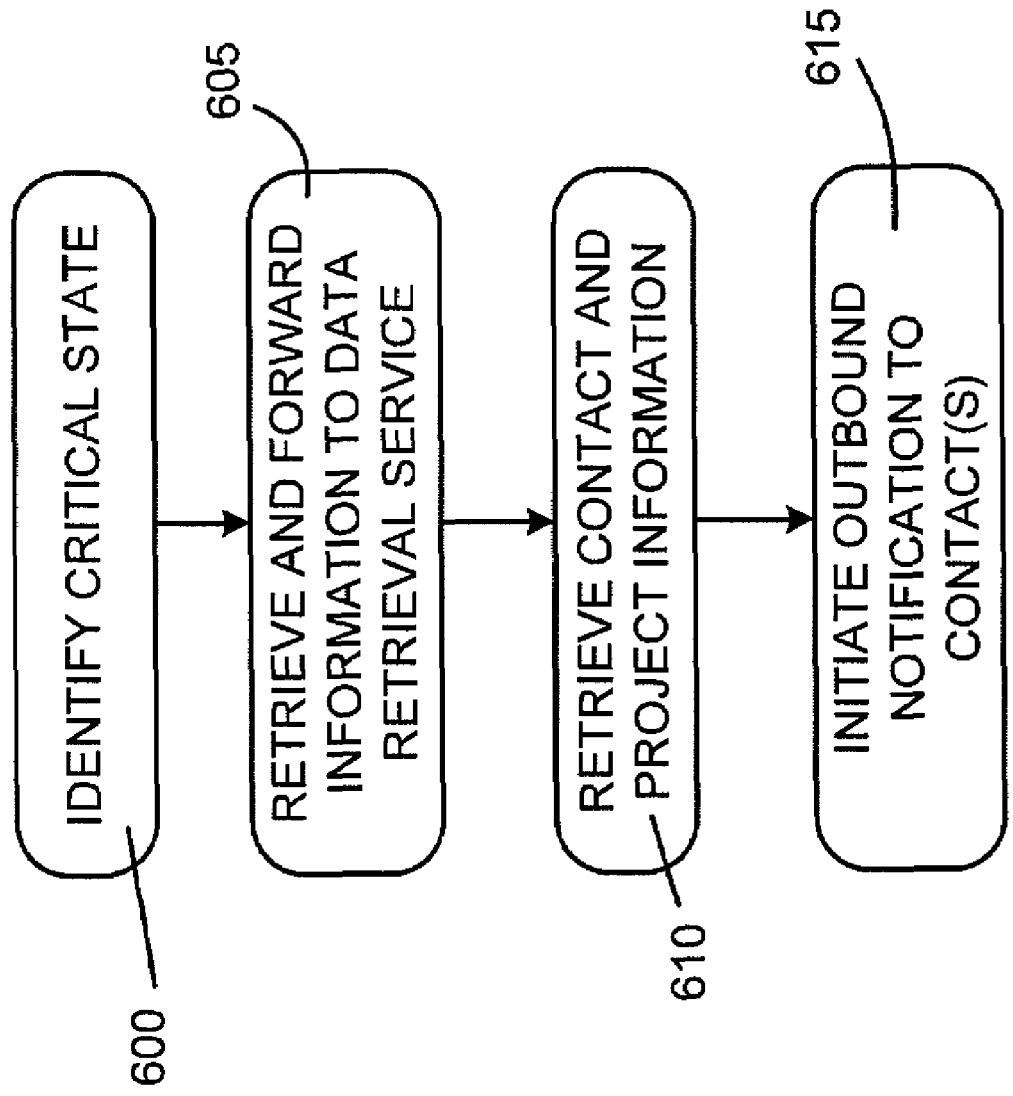
FIG. 6 is a flow diagram illustrating exemplary processing for providing outbound call functionality in the multimodal system of FIG. 2, in accordance with an embodiment.

FIG. 6 is a flow diagram illustrating exemplary processing for providing outbound notification functionality in the Multimodal System 210, in accordance with an embodiment. Processing may begin with the Project Management Outbound Notification Service 510 identifying a critical state (block 600). Information regarding the critical state may be retrieved by the Project Management Outbound Notification Service 510 and an outbound notification may be passed to the Critical State Data Retrieval Service 515 (block 605). The Critical State Data Retrieval Service 515 may retrieve contact and other project information based on defined project rules (block 610) and may notify one or more project contacts (block 615).

Figure 7:
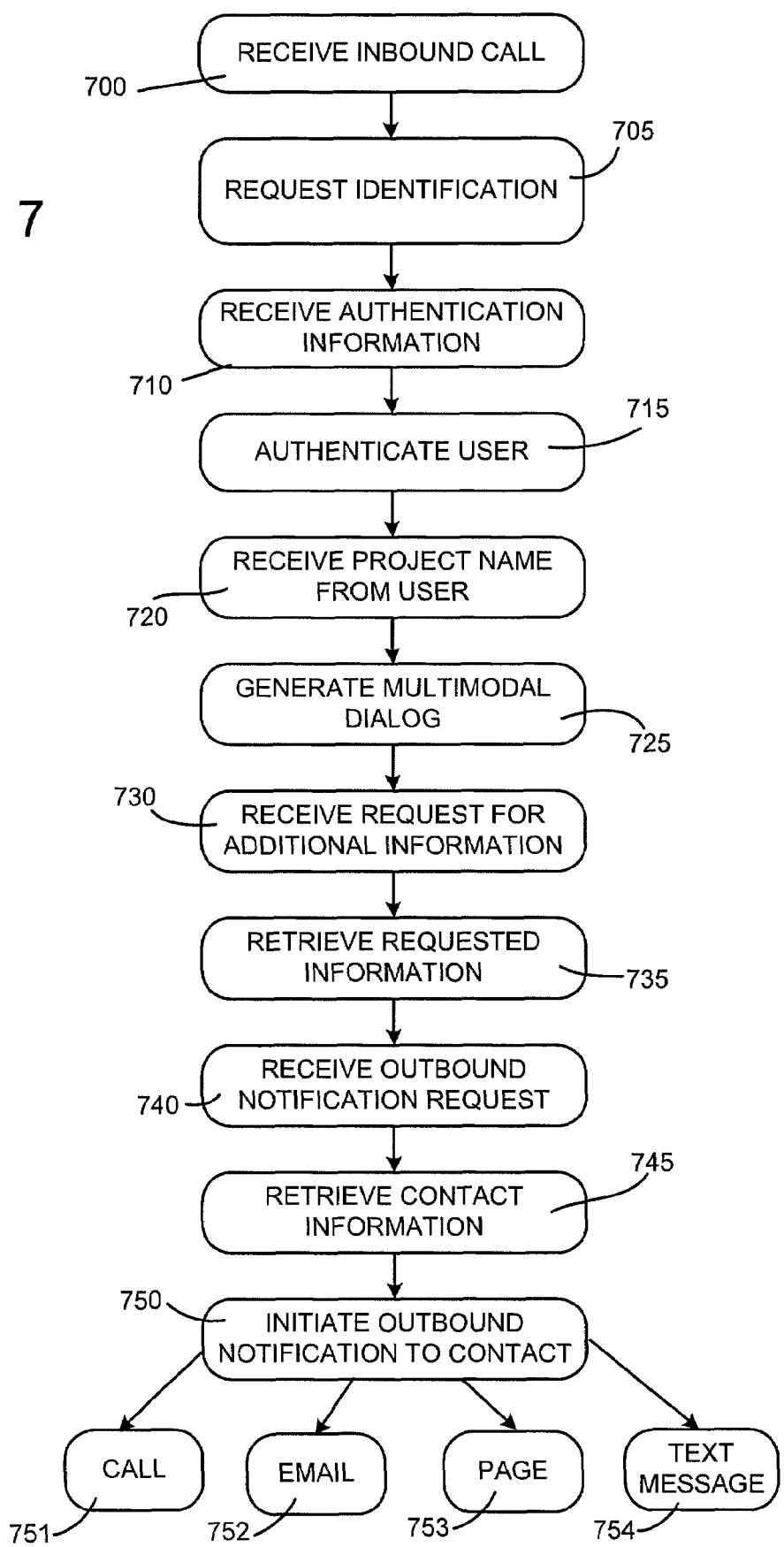
FIG. 7 is a flow diagram illustrating exemplary call processing for inbound project management calls, in accordance with an embodiment.

FIG. 7 is a flow diagram illustrating exemplary call processing for inbound project management calls in accordance with an embodiment. Initially, the Multimodal System 210 may receive an inbound call from a user (block 700). In response, the Multimodal System 210 may request for the user to provide authentication information (block 705). The user may then provide the requested authentication information (e.g., voice model, PIN number, password, ID number, etc.). The Multimodal System 210 may then receive the authentication from the user (block 710) and may authenticate the user. After the user has been authenticated, the Multimodal System 210 may serve a multimodal dialog to the user based on a dynamically generated multimodal document (block 715). For example, the Multimodal System 210 may serve the following dialog: "You have been identified as John Doe. Currently you have five active and three dormant projects. Please tell me the name of the project you would like to know the details about, or say 'List' to listen to the list of the projects."

The Multimodal System 210 may then receive a project name from the user, e.g., "Acme payment processing" (block 720). In response, the Multimodal System 210 may serve a dynamically generated multimodal dialog including information relating to the requested project (block 725). For example, the served multimodal dialog may include: "The team lead for Acme payment processing is Jane Doe and the project is in the development phase." As described above, the information provided may be dynamically configured to include only that information that the user is authorized to received.

In response to the dialog, a request for additional information relating to the project may be received from the user (block 730). For example, the user may request the following: "How many resources are assigned to this project" by, for example, entering such a request using a keypad of a User device or speaking such a request into a microphone of a User device. Provided that the received request corresponds to a defined grammar associated with the multimodal document resulting in the prior dialog, the Multimodal System 210 will retrieve the requested information from the datastore 250 and dynamically generate a new dialog including the retrieved information (block 735). For example, the next dialog may include: "There are three developers and two quality assurance representatives," and such a dialog may be provided to the user, for example, as synthetic speech through a speaker of the user device and/or as text on a display of the user device.

As described above, Multimodal System 210 may receive a user request to place an outbound notification to a project member. In response to such a request, the Multimodal System 210 may retrieve contact information for the requested individual (block 745) and initiate an outbound call (751) and/or send an email (752) and/or send a page (753) and/or send a text message (754) notification to the individual.

Figure 8:
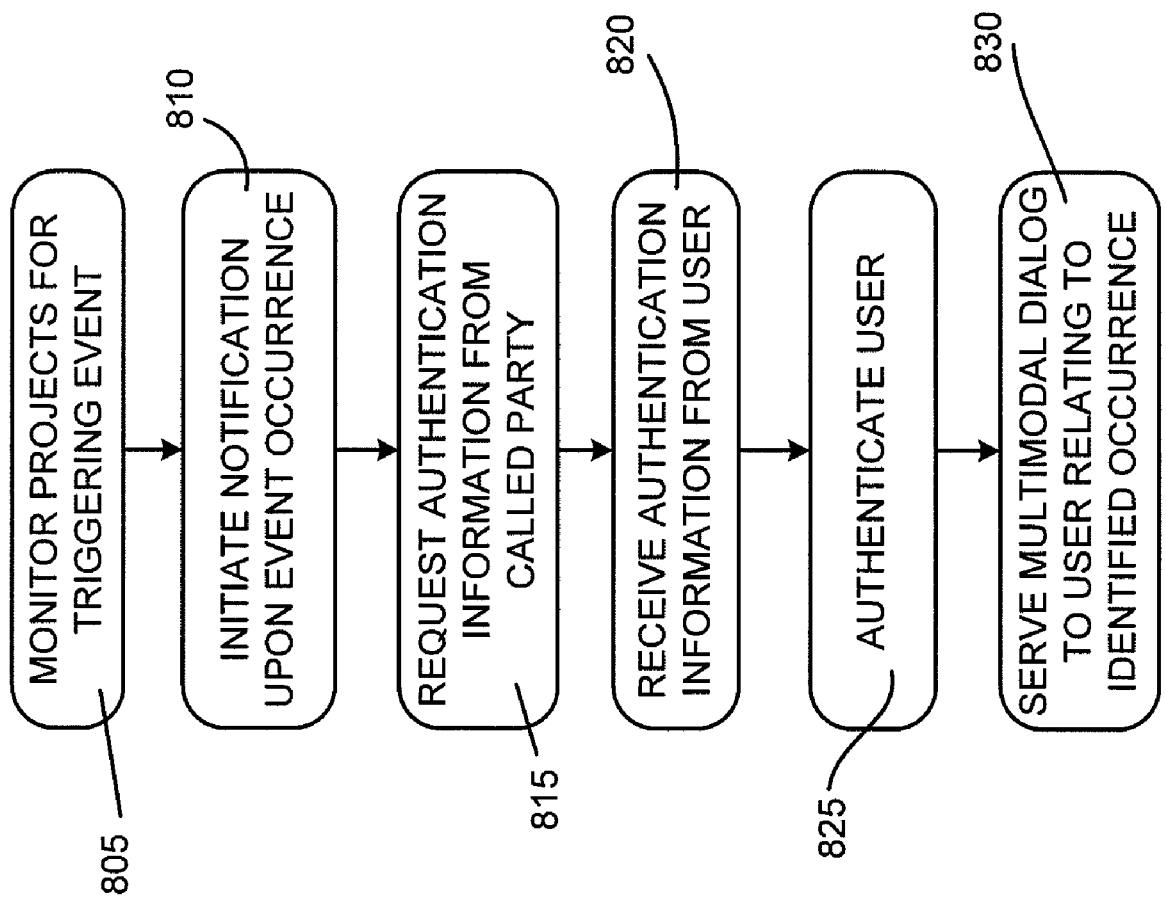
FIG. 8 is a flow diagram illustrating exemplary call processing for an outbound project management call, in accordance with an embodiment.

FIG. 8 is a flow diagram illustrating exemplary call processing for an outbound project management notification in accordance with an embodiment. Initially the Multimodal System 210 may monitor projects associated therewith for critical tasks or other outbound notification triggering events, such as task completion, project updates, or any other defined events (block 805). Upon identification of such an event, the Multimodal System 210 may initiate a notification to a predefined representative or representatives associated with the event (block 810). Upon notification, Multimodal System 210 may serve an introductory authentication dialog to the user, requesting authentication information prior to providing any project information (block 815). Multimodal System 210 may then receive authentication information from the user (block 820), authenticate the user (block 825), and serve the user a multimodal dialog containing the information relating to the identified event (block 830). Multimodal System 210 may then receive additional requests for project information or provide additional outbound notification in the manner described above, with respect to FIG. 7.

Figure 9:
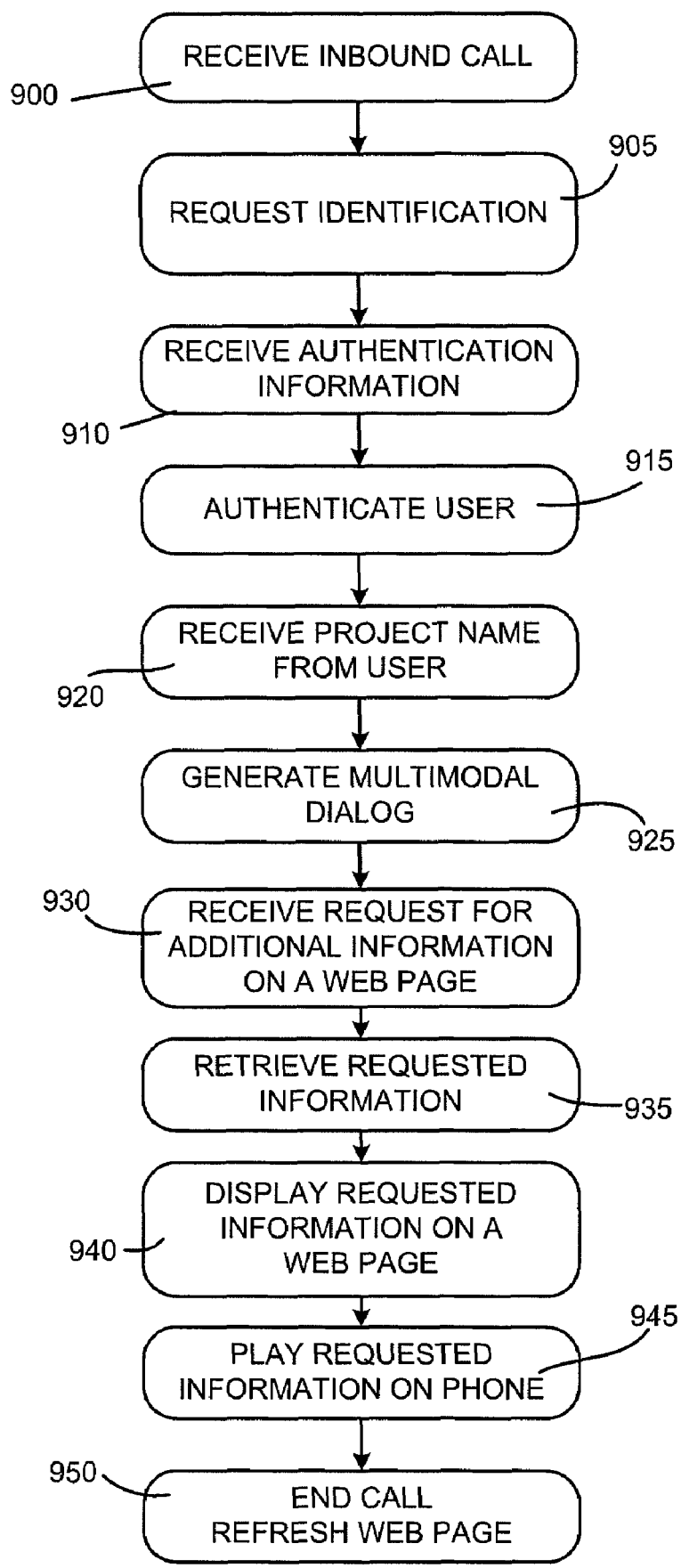
FIG. 9 is a flow diagram illustrating exemplary call processing for inbound project management calls, in accordance with another embodiment.

FIG. 9 is a flow diagram illustrating exemplary call processing for inbound project management calls in accordance with an embodiment. More particularly, FIG. 9 illustrates how embodiments may allow for a user to seamlessly transition between user interface modalities by transitioning, for example, between different types of user devices. As illustrated in FIG. 9, the Multimodal System 210 may initially receive an inbound telephone call from a user (block 900). In response, the Multimodal System 210 may request authentication information (block 905). The user may then provide the requested authentication information (e.g., voice model, PIN number, password, etc.) by speaking the authentication information into the microphone of the phone or by using the numeric keypad of the phone. The Multimodal System 210 may then receive this authentication information from the user (block 910) and may authenticate the user. After authenticating the user, as described above, the Multimodal System 210 may then serve a multimodal dialog based on a dynamically generated multimodal document to the user (block 915). The multimodal dialog may provide the user with a list of identified projects and may prompt the user to select one of the identified projects.

After serving the multimedia dialog to the user, the Multimodal System 210 may receive a project name from the user when, for example, the user speaks "Acme payment processing" into the microphone of the phone (block 920). In response, the Multimodal System 210 may generate and serve a new multimodal dialog including information relating to the requested project (block 925). As described above, the information provided may be dynamically configured to include only that information that the user is authorized to received.

After serving the new multimodal document to the user, the user may desire to switch from using the telephony user interface to a web based user interface. Thus the user may attempt to access the project management system using the web. After the user is authenticated, the Multimodal System 210 serves the same multimodal document to the web based user device that was last served to the telephony user device. Since the multimodal document contains the same dialog for a plurality of different modalities that a user may use, the dialog communicated over the web can be displayed on a web page and is synchronized with the telephony project management session.

In response to the dialog displayed on the web, the user may request that the project management system send additional information relating to the project on the web page (block 930). For example, the user may request the following additional information: "How many resources are assigned to this project." The Multimodal System 210 may then retrieve the requested information from the datastore 250 and dynamically generate a dialog including the retrieved information (block 935). The Multimodal System 210 may then display the information for the project on the web page (block 940), by communicating the multimodal document over the web based network, and/or may play the information on the phone (block 945), by communicating the same multimodal document over the telephony network. For example, the next dialog may include: "There are three developers and two quality assurance representatives." Multimodal system 210 may then receive a user request to end the call, and the Multimodal System 210 will end the call and synchronously will update the web page (block 950).

Thus, in light of the above description and Figures, it should be appreciated that embodiments provide for multimodal communication between a user and a content management system. In particular, the content management system is configured to generate multimodal documents that provide dialogs for a plurality of different user interface (output/input) modalities that may be available to users on one or more user devices. Since the multimodal system only generates and publishes a single multimodal document at a time for a particular user session regardless of the device and the communication system that is being used to access the multimodal system and since the multimodal document contains dialogs that can be presented using a plurality of different user interface modalities, the user can seamlessly switch from one user interface modality and one communication system to another user interface modality or communication system (using the same device or on a different device). In this regard, the system does not need to generate new or separate documents each time a user desires to communicate with the system using a different user input or output modality. Furthermore, since only a single document is published at a time for a given user session, the dialogs presented using different user interface modalities will be synchronized.

It is understood that the operations described for FIGS. 3-9 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. Referring to FIG. 2, for example, the executable portions may be stored in the datastore 250 or other memory such that the Multimodal System 210 and, more typically, a processing element, such as a microprocessor or other computing device, of the Multimodal System 210 may access and execute the executable portions of the computer program product in order to perform the functions described herein including, for example, those depicted in FIGS. 3-9.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
   receiving a first request to communicate with a first user having access to a first user interface modality;
   receiving a second request to communicate with the first user having access to a second user interface modality, the second user interface modality being different than the first user interface modality;
   generating a multimodal document having instructions for providing a dialog with a user, the instructions including at least a first set of instructions directed to the first user interface modality and a second set of instructions directed to the second user interface modality; and
   serving the multimodal document to the first user.

2. The method of claim 1, wherein the first user interface modality is supported by a first user device and the second user interface modality is supported by a second different user device.

3. The method of claim 2, wherein the generating the multimodal document follows the receiving of the first request, wherein the receiving of the second request follows the generating of the multimodal document, and wherein the method further comprises:
   serving the multimodal document to the first user device prior to receiving the second request; and
   serving the multimodal document to the second user device prior to processing a response received from the first device in response to the last served multimodal document such that the communication between the first user device and the second user device are substantially synchronized.

4. The method of claim 1, wherein generating a multimodal document comprises:
   providing a multimodal extensible markup language specification; and
   generating the multimodal document in accordance with the multimodal extensible markup language specification.

5. The method of claim 1 further comprising:
   creating grammar specifications;
   receiving a response from the first user; and
   interpreting the response based on the grammar specifications.

6. The method of claim 1, further comprising:
   receiving information from the first user, the information generated using a first user output modality of a user device; and
   interpreting the information received using a modality specific interpretation system.

7. The method of claim 1, further comprising:
   authenticating the identity of a user, wherein the authenticating comprises:
   generating a multimodal document requesting that a user provide authentication information using one of a plurality of user output modalities of a user device;
   receiving authentication information from the user in a format based on the user output modality used by the user to provide the authentication information;
   interpreting the authentication information from the user based on the format; and
   comparing the received authentication information with information stored in a datastore.

8. The method of claim 7, wherein the method is embodied in a project management system and wherein the method further comprises:
   using the authentication information received from the user and information stored in the datastore to determine the user's projects, the user's roles in the project, and the project management functions available to the user; and
   generating a multimodal document providing the user with a list of the available projects and command options.

9. A system comprising:
   a first communication interface configured to provide access to a datastore;
   a second communication interface configured to provide access to a first user device operated by a user; and
   a multimodal system configured to:
   receive a first request to communicate with the user through a user interface of the first user device;
   generate a multimodal document in response to a received request, the multimodal document comprising instructions allowing for communication with the user, the instructions including a plurality of different sets of instructions respectively directed to a plurality of different user interface modalities;

serve the multimodal document to the user device using the first communication interface;

receive a communication from the first user device in response to the multimodal document, the communication comprising user information in a format consistent with at least a first user interface modality of the plurality of user interface modalities;

interpret at least a portion of the communication;

generate a new multimodal document in response to the communication; and serve the new multimodal document to the first user device.

10. The system of claim 9, wherein the multimodal system is configured to receive the first request to communicate with the user from the first user device over a first network using a first communication protocol, and wherein the multimodal system is further configured to serve the multimodal document to the first user device using the first network and the first communication protocol.

11. The system of claim 9, wherein the multimodal system is further configured to manipulate information stored in the datastore based on the communication from the first user device.

12. The system of claim 9, wherein the multimodal system is configured to receive a second request to communicate with the user from a second user device over a second network using a second communication protocol, and wherein the multimodal system is further configured to take the same multimodal document that was last served to the first user device and serve it to the second user device using the second network and the second communication protocol.

13. The system of claim 12, wherein the multimodal system is configured to receive a communication from the second user device in response to the multimodal document, the communication comprising user information in a format consistent with at least a second user interface modality of the plurality of user interface modalities, and wherein the multimodal system is further configured to:

interpret at least a portion of the communication;

generate a new multimodal document in response to the communication; and serve the new multimodal document to the first user device and the second user device.

14. The system of claim 9, further comprising an outbound notification system configured to generate the first request and communicate the first request to the multimodal system.

15. The system of claim 14, wherein the system comprises a project management system, wherein the project management system comprises a critical state data retrieval system configured to determine when a project stored in the datastore reaches a critical state, wherein the outbound notification system is configured to generate the first request in response to the critical state data retrieval system determining that a project has reached a critical state.

16. The system of claim 9, further comprising a user authentication system configured to authenticate the identity of the user by generating a multimodal document requesting that a user provide authentication information using one of a plurality of user output modalities of a user device, receiving authentication information from the user in a format based on the user output modality used by the user to provide the authentication information, interpreting the authentication information from the user based on the format; and comparing the received authentication information with information stored in the datastore.

17. The system of claim 16, wherein the system comprises a project management system and wherein the system further comprises:

a user role and accessibility system configured to use the authentication information received from the user and information stored in the datastore to determine the user's projects, the user's roles in the projects, and the project management functions available to the user, wherein the multimodal system is configured to generate a multimodal document providing the user with a list of the available projects and project management functions determined by the user role and accessibility system.

18. A computer program product for providing a multimodal content management application, the computer program product comprising at least one computer-readable storage medium having computer-readable program code portions stored therein, the computer-readable program code portions comprising:

a first executable portion for providing the content management application with access to a first user device operated by a user;

a second executable portion for receiving a first request to communicate with the user through a user interface of the first user device;

a third executable portion for generating a multimodal document in response to a received request, the multimodal document comprising instructions allowing for communication with the user, the instructions including a plurality of different sets of instructions respectively directed to a plurality of different user interface modalities; and a fourth executable portion for serving the multimodal document to the user device using the first executable portion;

a fifth executable portion for receiving a communication from the first user device in response to the multimodal document, the communication comprising user information in a format consistent with at least a first user interface modality of the plurality of user interface modalities;

a sixth executable portion for interpreting at least a portion of the communication;

a seventh executable portion for generating a new multimodal document in response to the communication; and an eighth executable portion for serving the new multimodal document to the first user device.

19. The computer program product of claim 18, further comprising:

a ninth executable portion for manipulating information stored in the datastore based on the communication from the first user device.

20. The computer program product of claim 18, further comprising a ninth executable portion configured to receive a second request to communicate with the user from a second user device over a second network using a second communication protocol; and a tenth executable portion for taking the same multimodal document that was last served to the first user device and serving it to the second user device using the second network and the second communication protocol.

21. The computer program product of claim 20, further comprising:
- an eleventh executable portion configured to receive a communication from the second user device in response to the multimodal document, the communication comprising user information in a format consistent with at least a second user interface modality of the plurality of user interface modalities;
- a twelfth executable portion for interpreting at least a portion of the communication;
- a thirteenth executable portion for generating a new multimodal document in response to the communication; and
- a fourteenth executable portion for serving the new multimodal document to the first user device and the second user device.

22. The computer program product of claim 18, further comprising:
- a ninth executable portion for accessing a datastore comprising information about at least one project;
- a tenth executable portion for determining when a project stored in the datastore reaches a critical state; and
- a tenth executable portion for generating the first request in response to the sixth executable portion determining that a project has reached a critical state.

* * * * *